July 20, 1954  W. V. COVERT  2,683,993
PHASE SHIFTING DEVICE
Filed May 17, 1951

INVENTOR.
William V. Covert
BY
O. B. Turner
Atty.

Patented July 20, 1954

2,683,993

UNITED STATES PATENT OFFICE 2,683,993

PHASE SHIFTING DEVICE

William V. Covert, Indianapolis, Ind., assignor to Diamond Chain Company, Inc., Indianapolis, Ind., a corporation of Indiana Application May 17, 1951, Serial No. 226,793

6 Claims. (Cl. 74—219)

This invention relates to a device by which the phase angularity or angular displacement between shafts connected with each other, as by a chain gearing, may be shifted.

The invention is particularly useful in connection with shafts which require adjustment when a combustion engine is reversed, in which case the angular displacement of the cam shaft must be changed relative to the crank shaft to comply with rotation of the engine in advance or reverse thereof.

A primary object of the present invention is to devise a novel device wherein the relatively angular displacement of shafts connected to a common flexible chain may be varied by moving the chain.

Another object of the invention is to maintain a constant chain tension at all points of phase shifting.

A more specific object of the invention is to provide a pair of idler sprockets engaged with the chain and to provide means for simultaneously moving the sprockets to vary the phase angularity of the shafts.

The foregoing and other objects and advantages of the invention will become apparent from a consideration of the following specification and the accompanying drawings, wherein.

Figure 1:
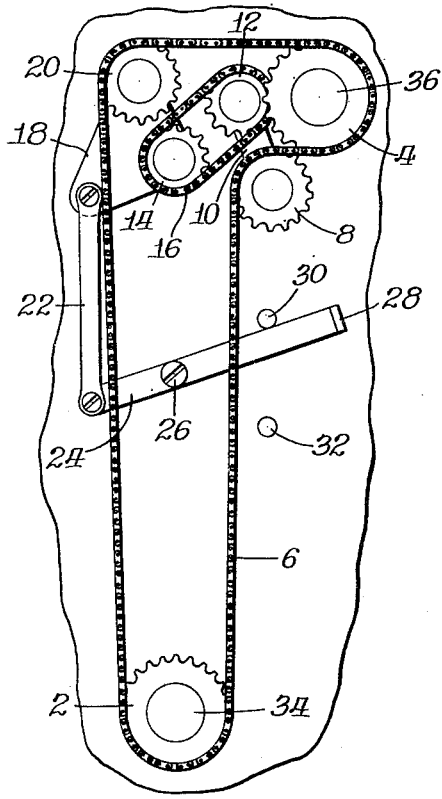
Figure 1 is a plan view of a chain drive system embodying the invention.

Describing the invention in detail and referring first to Figure 1, the novel chain drive system comprises a drive sprocket 2 and a driven sprocket 4 engaged with a continuous drive chain 6. The outside of the chain 6 is engaged by an idler sprocket 8 which is free to rotate about its center and is mounted on a lever 10 keyed by any conventional means (not shown) to an adjuster sprocket 12, the rotational or fulcrum axis of the lever is preferably coaxial with that of the sprocket 12 to which the lever is keyed.

The adjuster sprocket is operatively connected to another adjuster sprocket 14 by means of a continuous chain 16 surrounding the sprockets 12 and 14 and engaged therewith, and the sprocket 14 is keyed by any conventional means (not shown) to a generally triangular lever member 18 which carries an idler sprocket 20 engaged with the inside of the chain 6, said idler sprocket 20 being free to rotate about its center. The rotational or fulcrum axis of the lever 18 is preferably coaxial with that of its sprocket 14 to which the lever 18 is keyed.

The lever member 18 may be actuated by any conventional means, such as a lever or fluid pressure device, and in the illustrated embodiment is pivotally connected to a link 22 which is in turn pivotally connected to a lever 24 fulcrumed as at 26 and having a handle 28 adapted to rotate the lever 24 between a pair of stops 30 and 32, respectively.

Figure 2:
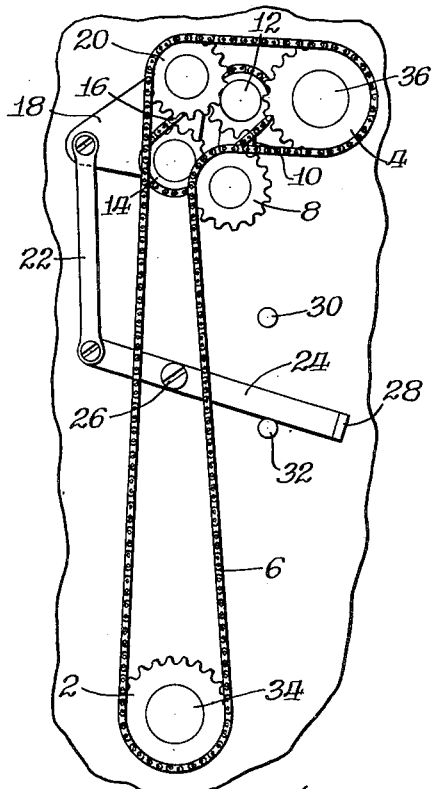
Figure 2 is another plan view showing the system of Figure 1 in changed position.

In Figure 1, the lever 24 is illustrated in engagement with the stop 30 under which conditions the sprockets 2 and 4 rotate in unison, the sprocket 2 being keyed in conventional manner to a concentric drive shaft 34, and the sprocket 4 being keyed to a concentric drive shaft 36, said shafts being in a predetermined phase relationship which may be changed or shifted, as shown in Figure 2, by rotating the lever 24 to engagement with the stop 32 thereby rotating the idler sprockets 20 and 8 about the centers of the adjuster sprockets 14 and 12 respectively, inasmuch as the sprocket 20 is eccentric with respect to its adjuster sprocket 14 and the sprocket 8 is eccentric with respect to that of its adjuster sprocket 12.

It may be noted that an important feature of the novel system resides in the manner in which the idler sprockets 8 and 20 are normally rotatable on their own centers or axes, and during adjustment are also rotatable on the axes of the adjuster sprockets 12 and 14, respectively. The rotational axes of the adjuster sprockets 12 and 14 are normally fixed with respect to each other during operation of the device, although, if desired, means may be provided for adjusting these axes in any fixed relationship with respect to each other.

Another important aspect of the invention resides in the manner in which the adjuster sprockets 12 and 14 are surrounded by and are engaged with a closed chain 6 to afford an unusually simple and compact arrangement wherein rotation of one of the idler sprockets 8 or 20 about the axis of its adjuster sprocket 12 or 14, respectively, simultaneously effects rotation of the other idler sprocket about the axis of its adjuster sprocket to maintain substantially uniform tension in the chain 6 at all times during phase shifting.

It will be understood that the novel system above described is so designed that the chain 6 is maintained under constant tension during phase shifting, and if change of sprocket diameter or center location is desired, by a proper combination of lever linkage, sprocket ratios and center location, such changes may be effected in a device constructed according to the invention which will maintain uniform tension in the chain 6 during phase shifting.

Figure 3:
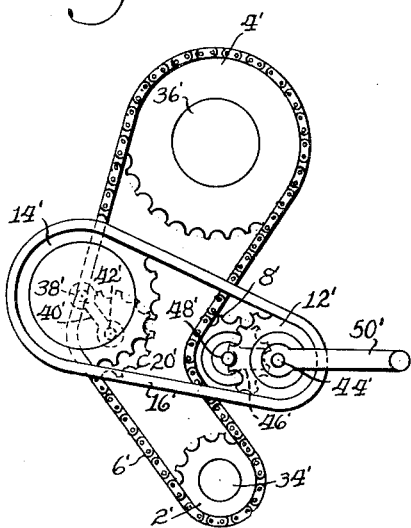
Figure 3 is a plan view of a modified chain drive system embodying the invention.

An example of such a modified arrangement is shown in Figure 3, wherein parts corresponding to those of Figures 1 and 2 are identified by corresponding numerals.

Figure 4:
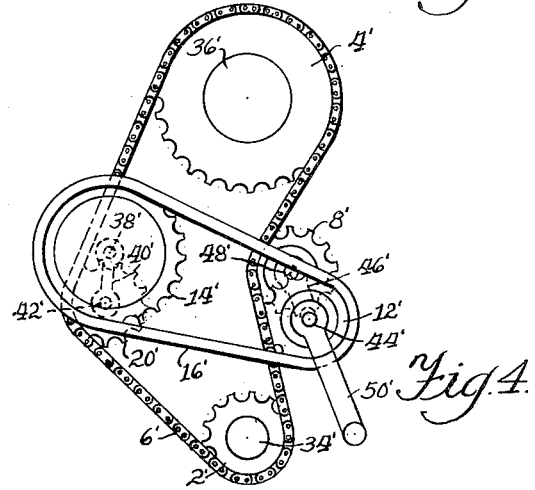
Figure 4 is a plan view showing the system of Figure 3 in changed position.

In Figures 3 and 4, the adjuster sprockets 12' and 14' are disposed between the drive sprocket 2' and the driven sprocket 4'. The adjuster sprocket 14' is keyed to a rotatable coaxial shaft 38' which is also keyed to a lever 40' affording a rotational mounting at 42' to the center of the idler sprocket 20', which as in the previously described embodiment engages the inside of the drive chain 6'.

The adjuster sprocket 12' is similarly keyed to a shaft 44' which is also keyed to a lever 46' affording a rotational mounting as at 48' to the center of the idler sprocket 8', which as in the previously described embodiment engages the outside of the drive chain 6'.

The shaft 44' is also keyed to a lever 50' which may be actuated from the position shown in Figure 3 to the position shown in Figure 4, to vary the phase angularity of the shaft 36' relative to the shaft 34'.

As in the previous embodiment the idler sprockets 8' and 20' are normally rotatable on their own centers or axes and during adjustment are also rotatable on the axes of the adjuster sprockets 12' and 14', respectively. The rotational axes of the adjuster sprockets 12' and 14' are normally fixed with respect to each other during operation of the device, although, if desired, means may be provided for adjusting these axes in any fixed relationship with respect to each other.

As in the embodiment of Figures 1 and 2, the adjuster sprockets 12' and 14' are surrounded by and engaged with a closed chain 16' to afford an unusually simple and compact arrangement wherein rotation of one of the idler sprockets 8' or 20' about the axis of its adjuster sprocket 12' or 14' respectively, simultaneously effects rotation of the other idler sprocket about the axis of its adjuster sprocket to maintain substantially uniform tension in the chain 6' at all times during phase shifting.

I claim:

1. In a device for varying relative angularity of shafts having sprockets connected by a chain; the combination of a pair of adjusting sprockets having relatively fixed rotational axes, levers coaxial with respective adjusting sprockets, idler sprockets carried by said levers and rotatably mounted thereon, said idler sprockets engaging the chain, another chain engaging the adjusting sprockets, and means for actuating one of the levers.

2. In a device for varying relative angularity of shafts having sprockets connected by a chain; the combination of a pair of adjusting sprockets having relatively fixed rotational axes, levers coaxial with respective adjusting sprockets, idler means carried by said levers and rotatably mounted thereon, the idler means of one lever engaging the inside of the chain, and the idler means of the other lever engaging the outside of the chain, another chain engaging the adjusting sprockets for interconnecting the same, and means for rotating one of the adjusting sprockets about its axis.

3. In a device for varying the phase of one shaft relative to another; the combination of sprockets keyed to respective shafts, a flexible chain meshed with said sprockets, a pair of adjuster sprockets, means operatively connecting the adjuster sprockets to each other whereby rotation of one adjuster sprocket is effective to rotate the other adjuster sprocket in the same direction of rotation, a pair of idler members engaging said chain, levers connected to respective idler members, said levers being keyed to respective adjuster sprockets, and means for rotating at least one of the adjuster sprockets.

4. In a device for varying relative rotational angularity between shafts having sprockets meshed with a common flexible drive chain; the combination of a pair of adjuster sprockets, a continuous flexible chain surrounding said adjuster sprockets and meshed therewith, idler means eccentric with respect to each adjuster sprocket, said idler means being engaged with the first mentioned chain, levers connected to said idler means, said levers being keyed to respective adjuster sprockets, and means for rotating at least one of the adjuster sprockets.

5. In a device for varying relative rotational angularity between sprockets meshed with a common flexible chain; the combination of a pair of adjuster sprocket members, a continuous flexible chain surrounding the members and meshed therewith, idler members engaging the inside and outside of the drive chain, respectively, levers connected to respective idler members and keyed to respective sprocket members, and means for rotating at least one of the idler members about the axis of a sprocket member.

6. In a device for varying relative rotational angularity between sprockets meshed with a common flexible chain; the combination of idler members engaged respectively with the inside and the outside of the chain, rotatable members eccentric with respect to respective idler members, levers connected to respective idler members and keyed to respective rotatable members, means interconnecting said rotatable members for rotation in unison, and means for rotating at least one of said rotatable members.

References Cited in the file of this patent
UNITED STATES PATENTS

| Number | Name | Date |
| --- | --- | --- |
| 1,801,043 | Harber et al. | Apr. 14, 1931 |
| 1,808,588 | Allen | June 2, 1931 |
| 2,277,458 | Schultze | Mar. 24, 1942 |